United States Patent Office 3,455,181
Patented July 15, 1969

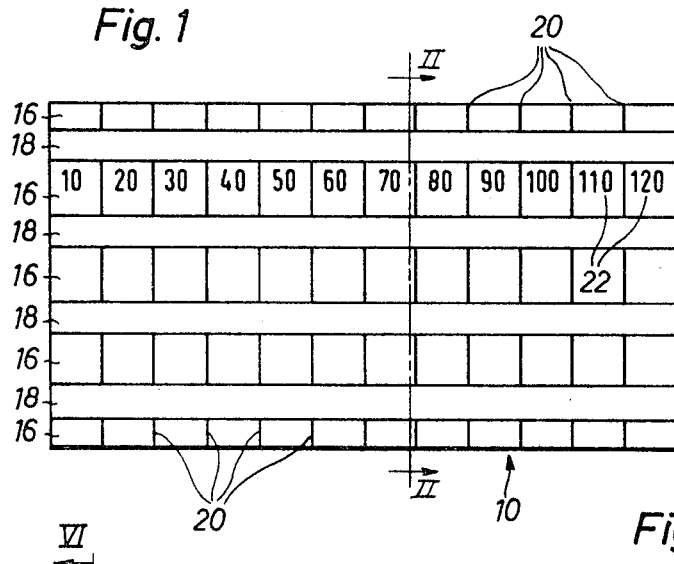
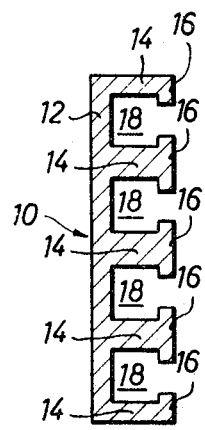
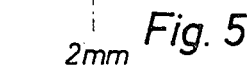
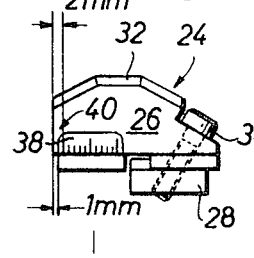
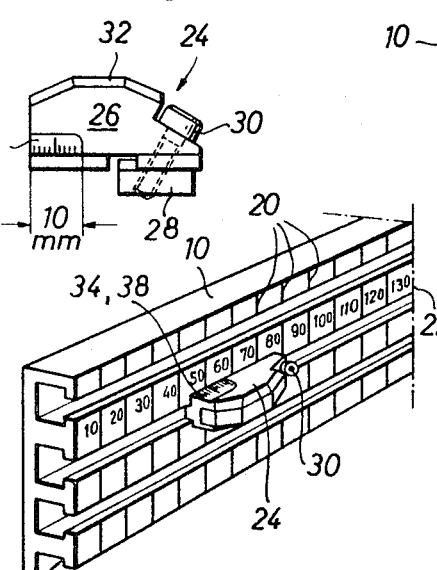

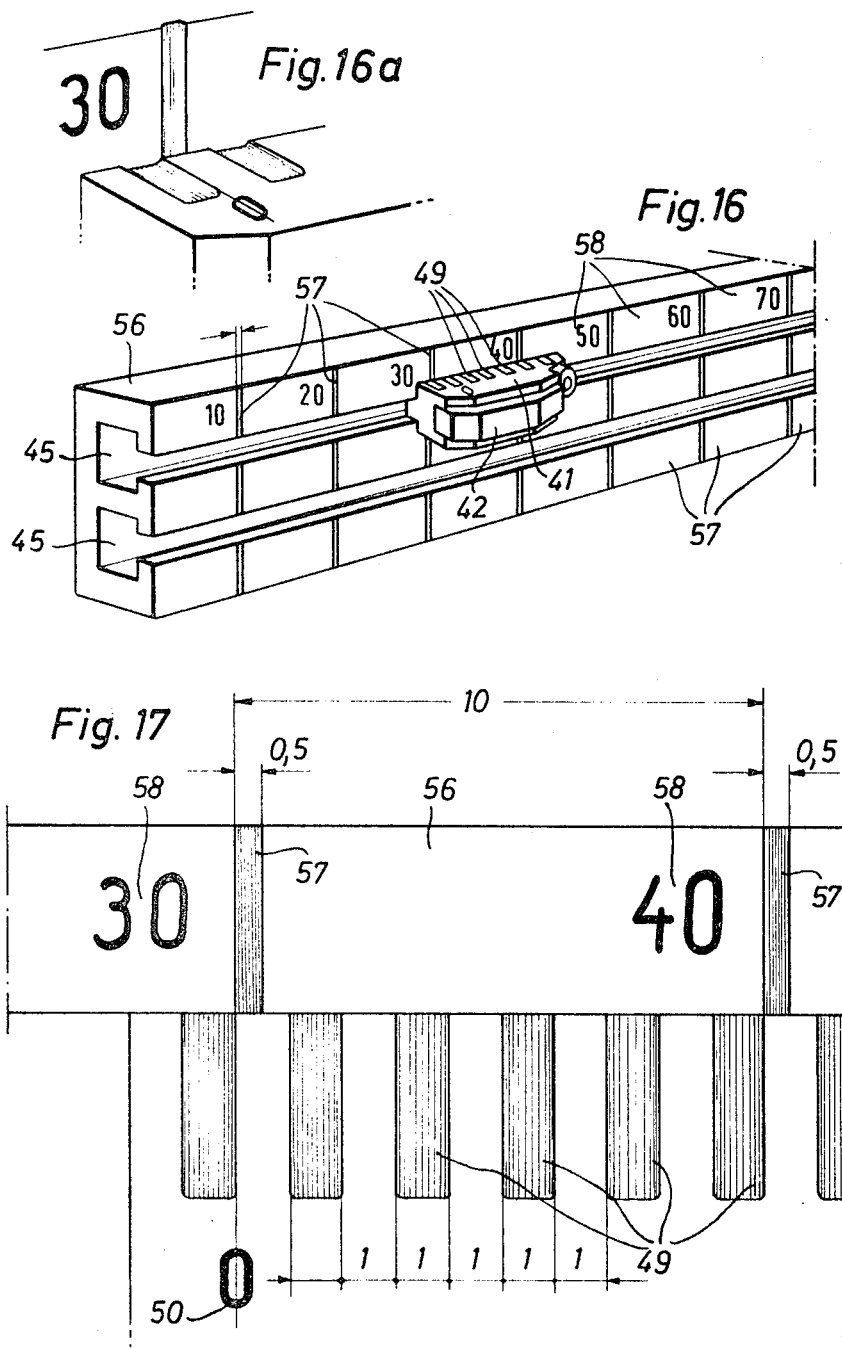

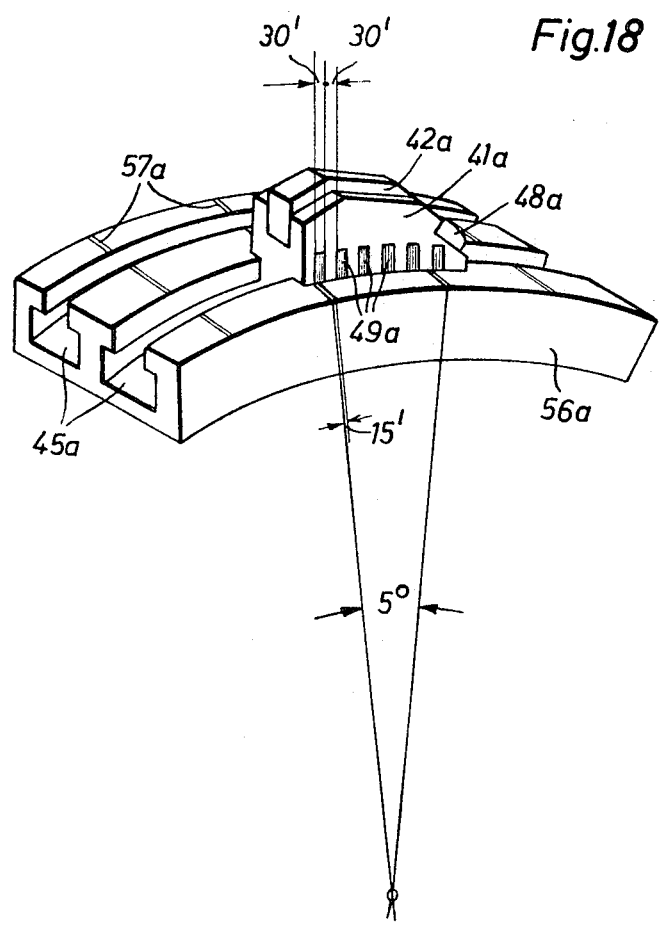

3,455,181
CONTROL CAM ARRANGEMENT
Jakob Wollenhaupt, Cologne, Bruck, Germany, assignor to Kurt Maecker, Dusseldorf, Germany
Filed July 21, 1967, Ser. No. 655,128
Claims priority, application Germany, July 22, 1966, E 31,262
U.S. Cl. F16h 53/04
U.S. Cl. 74—568          15 Claims

ABSTRACT OF THE DISCLOSURE

Combination of a member with a groove field and cams adjustable in the grooves of the field with coarse graduations on the member and fine graduations on the cams to permit precise adjustment of the cams along the grooves.

---

The present invention relates to a control cam arrangement and, more specifically, concerns an arrangement of a cam control on a field of grooves and the control cams connectable thereto for a medium fine adjustment of the control cams in the groove field in connection with the setting up of a program.

It is known to effect the control of machines, especially machine tools, by arranging cams on the machine carriage which cams cooperate with control strikers arranged on the machine at appropriate areas thereof so that when a cam of the machine carriage abuts a control striker pertaining thereto, an electric switch will be actuated which brings about a corresponding control of the machine. The term "control" in this connection comprises the automatic displacement of the machine carriage to definite predetermined positions, the movement over predetermined distances and the automatic sequence of a plurality of different predetermined strokes—short stroke sequences—and the release of control signals during the movement over certain distances or at certain points. In actual practice, the machine carriages are provided with a plurality of control cams which cooperate with correspondingly arranged control strikes and which preferably are displaceably connected in the grooves of a groove field. The various grooves of the groove field are arranged in the manner of superimposed rows. For setting up a program in a machine of this type, the various control cams are in conformity with the desired program clamped at corresponding points of the individual grooves. To this end, heretofore a ruler divided into centimeters was employed by means of which was measured the precise connecting point of the individual control cams in the grooves. In this way, a coarse adjustment of the control cams in the groove field was obtained which, however, was only with a few machine types sufficiently precise in order to realize the desired operation of the machine.

There has also become known a method of and device for fine adjusting control cams in a groove field according to which a ruler is connected to the groove field and additionally an adjusting device is employed which has an abutment for the cams. The said ruler cooperates with a first comparison ruler rigidly connected to the adjusting device and with a second vernier slide which is displaceable in front of said ruler. By means of such a device a very precise adjustment of the control cams in the groove field is possible. In many instances, however, it is not necessary to employ such a relatively complicated and expensive device since frequently a medium fine adjustment of the control cams in the groove field will suffice for the desired operation of the machine. Such medium fine adjustment of the control cams is obtainable by the above mentioned coarse adjusting method by means of a ruler.

It is, therefore, an object of the present invention to provide an arrangement of the above mentioned general type which will make possible a medium fine adjustment of the control cams in the groove field without the necessity of employing relatively complicated and expensive additional devices as is the case with the above mentioned fine adjustment device.

It is another object of this invention to provide the possibility of adjusting the control cams in the groove field with greater precision than was possible with the heretofore known coarse adjustment method while the adjustment of the control cams in the groove field according to the present invention should permit a precision which equals a fraction of a millimeter as it is just observable with the naked eye.

It is still another object of this invention to provide a cam control as set forth above which is relatively simple in construction and low in cost.

These and other objects and advantages of the invention will appear more clearly from the following specification in connection with the accompanying drawings, in which:

FIG. 1 diagrammatically illustrates a groove field according to the present invention.

FIG. 2 represents a section through the groove field of FIG. 1, said section being taken along the line II—II of FIG. 1.

FIG. 3 shows a section through a groove field according to FIGS. 1 and 2 the upper side of which has connected thereto a fine scale ruler.

FIG. 4 illustrates a side view of a control cam provided with a fine scale in conformity with the present invention.

FIG. 5 is a slight modification over the control cam of FIG. 4.

FIG. 6 is a section taken along the line VI—VI of FIG. 5.

FIG. 7 is an isometric view of a portion of a groove field with a control cam connected thereto.

FIG. 16 is an isometric view of a two-row groove field with a control cam according to FIGS. 8 to 10.

FIG. 16a illustrates on an enlarged scale a portion of FIG. 16.

FIG. 17 illustrates on an enlarged scale the cooperation between the coarse scale and the fine scale in conformity with the present invention.

FIG. 18 is a perspective illustration of further features in accordance with the present invention.

Figure 9:
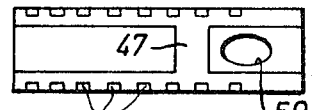
FIG. 9 is a bottom view of the arrangement of FIG. 8.

The present invention is characterized primarily in that on the outside of the groove field there is provided a coarse scale with, for instance, a ten millimeter division or graduation while on the control cam adjacent this coarse scale there is provided a fine scale with, for instance, a one millimeter division.

With the cooperation of these two scales, the program setter will then be able to adjust the control cam in the groove field with a precision which corresponds, for instance, to a fraction of a millimeter just noticeable with the naked eye. It is, of course, understood that the program setter may also use a magnifying glass or high power magnifier which may, if desired, be connected to the control cam or to the groove field. Advantageously, the coarse scale extends over the entire surface of the front flange of the groove field so that all of the control cams of the groove field which are provided with a corresponding fine scale will be able to cooperate with this coarse scale. The fine scale is preferably arranged on the upper side surface of the control cam.

According to a preferred embodiment of the invention, the side surface of the control cam is provided with a recess having inserted therein plates provided with a fine scale. It has proved particularly advantageous to arrange the fine scale on the control cam in such a way that a certain graduation or division corresponds to a point of reference, for instance, the control point. In these circumstances, the program setter will be able to set with high precision the control cam while taking into consideration the said point of reference in the groove field.

In a manner known per se, the upper side of the groove field may have connected thereto a fine scale ruler the division of which corresponds to the coarse scale.

According to a particularly advantageous embodiment of the invention, with a cam body, the fine scale consists of a sequence of sharp-edged grooves while the width of the grooves and the spacing from each other is constant and preferably uniform. Thus, instead of the provision of a scale composed of graduations, the grooves forming the fine scale are formed into the cam body while the width of said grooves and the spacing between said grooves corresponds to the spacing of the graduation of the fine scale. Such an arrangement brings about that the production of the fine scale on the control cam can be effected at reduced costs while at the same time a more precise adjustment of the control cams and additionally a reduction in the program setting time will be realized. The grooves forming the fine scale are produced simultaneously with the production of the control cam so that no additional working operation for providing the fine scale will be required. Moreover, the danger is eliminated that a fine scale applied by pressure or in any other way may be worn off in the course of the use of the arrangement. When producing the fine scale, any engraving and all additional printing operations or the gluing of scale plates will be eliminated because the fine scale is produced during the producing of the control cam by designing the casting mold accordingly so that no additional costs are involved.

The fine scale does not consist of very fine millimeter lines but the relatively wide grooves of the fine scale can be produced during the casting with sharp edges. With a centimeter division of the coarse scale, the width of the grooves and their spacing may amount to one millimeter. The grooves may be arranged either on the cam body or also in the casting body of a spring clamping device of the cam.

According to a further embodiment of the invention, the width of the graduating lines of the coarse scale equals half the width of the groove. Thus, if the groove has a width of one millimeter, the width of the graduating lines of the coarse scale will be one half of a millimeter. In this way, the medium fine adjustment of the control cams is possible with a precision of one half of a millimeter, and the estimate of further intermediate values is further facilitated.

If desired, the bottom of the grooves and/or the webs between successive grooves may be provided with contrasting color which likewise will facilitate the setting of the program.

Referring now to the drawings in detail, the groove field 10 comprises a back wall 12 by means of which the groove field is connected to the respective machine. From said back wall 12, webs 14 extend in forward direction and have their outer ends provided with flanges 16 so that a plurality of undercut grooves 18 are formed which are arranged in rows. Groove fields of this type are known per se.

From FIGS. 1 to 7 it will be evident that on the front side of flange 16 of the groove field 10 there is provided a coarse scale 20 which may, for instance, have a ten millimeter division. The graduating figures of the coarse scale 20 are designated at 22.

It has already been suggested to provide an upper side of a groove field 10 with a fine scale ruler 23 as shown in FIG. 3. The graduation of such fine scale ruler 23 is then brought into correspondence with the coarse scale 20.

FIG. 4 shows a customary control cam 24 in side view. This cam 24 comprises a cam body 26 having its bottom side provided with a protrusion 27 (FIG. 6) by means of which the cam body 26 extends between the flanges 16 of the groove field 10. Arranged within the upper side of the cam body 26 is a sliding body or control body 32 on which the control striker of the switch will move. By means of a screw 30, a groove block 28 is connected to the bottom side of the control cam 24. Said grove block 28 is arranged in the interior of the groove 18 of the groove field 10 and is wider than the gap between the flanges 16 of the groove field 10.

The upper side of the groove body 26 (FIG. 7) has arranged thereon a fine scale 34. This fine scale 34 may be colored, may be etched into the groove body 26 or may be glued or cemented onto the cam body 26. The fine scale 34 has its lower end, in conformity with FIGS. 4 and 7, arranged at the lower marginal portion of the cam body 26 and thus directly adjacent the coarse scale 20 on the groove field 10. In the illustrated embodiment, the fine scale 34 has a graduation of ten millimeters.

According to the embodiment of FIGS. 5 and 6, a recess 36 may be provided in the cam body 26 into which is inserted the fine scale 38 in the form of a plate.

According to the embodiment shown in FIG. 4, the zero graduation line of the fine scale 34 coincides with the left-hand abutment edge (with regard to FIG. 4) of the control cam 24. In contrast thereto, with the embodiment shown in FIGS. 5 and 6, the recess 36 is spaced, for instance, by one millimeter from the left-hand abutment edge (with regard to FIG. 5) or the cam body 26 so that, for instance, the zero graduation line 40 of the fine scale plate 38 coincides with a reference point (which may for instance be the control point), which in FIG. 5 is spaced two millimeters from the left-hand abutment edge of the control cam 24.

With the described arrangement it is possible to connect a control cam 24 in the groove field 10 with a precision less than one millimeter.

The invention is, of course, not limited to the particulars illustrated in the drawings. Numerous modifications are possible within the frame work of the invention which consist in arranging a coarse scale on the groove field and a fine scale, for cooperation with the coarse scale, on the control cam in order thereby to be able to effect a medium fine adjustment of the control cam in the groove field without resorting to further devices. The graduations referring to millimeters are, of course, given merely by way of example. It is obvious that also for purposes of adjusting the control cams 24 magnifying glasses or the like may be employed which can, if so desired, be connected to the control cam 24.

Figure 8:
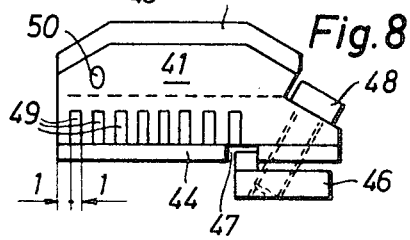
FIG. 8 is a side view of a special embodiment of the present invention.
Figure 10:
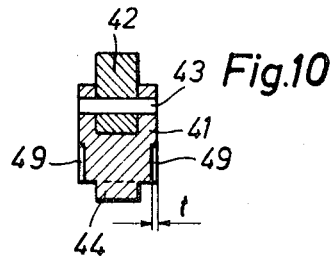
FIG. 10 is a cross section through the arrangement of FIG. 8.
Figure 11:
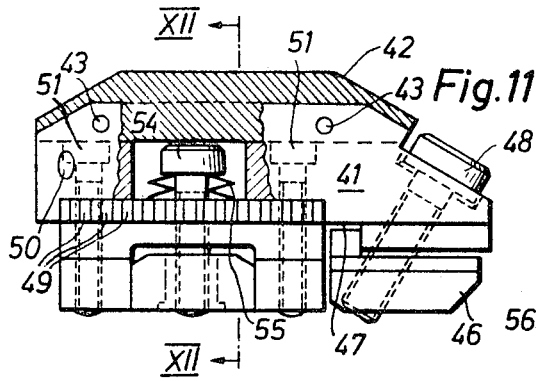
FIG. 11 shows a further modification of a control cam according to the invention in partly cut open condition.
Figure 12:
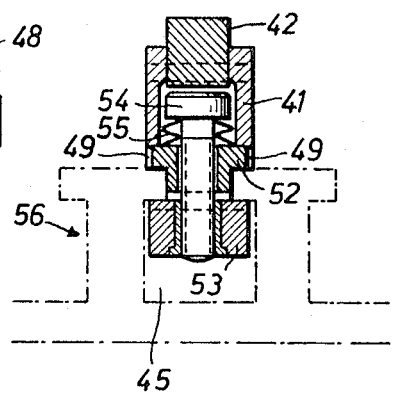
FIG. 12 is a cross section along the line XII—XII of FIG. 11.
Figure 13:
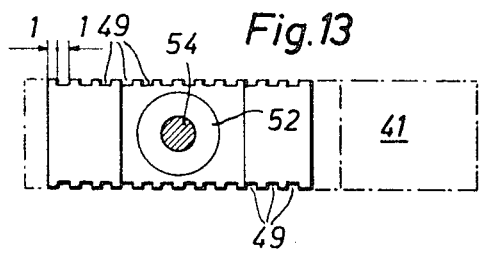
FIG. 13 is a bottom view of FIG. 11.
Figure 14:
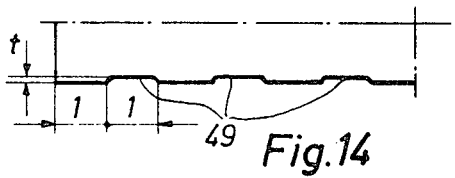
FIG. 14 illustrates on a somewhat larger scale a portion of the fine scale of the control cam according to FIGS. 11 to 13.
Figure 15:
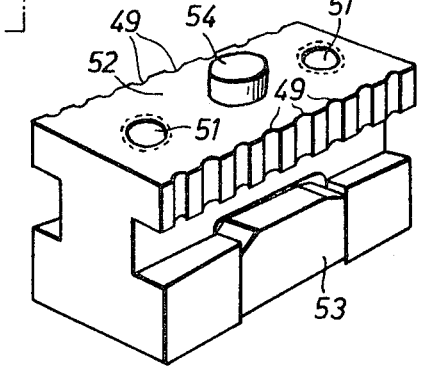
FIG. 15 is an isometric view of the clamping arrangement with the fine scale according to the present invention as detached from the control cam of FIG. 11.

The control cam illustrated in FIGS. 8 to 10 comprises a cam body 41 produced by injection molding, pressure casting, extrusion molding by drawing or extrusion pressing a corresponding profile and which has its upper side provided with a U-shaped recess for receiving therein a body 42 for engagement with the control striker of the respective switch, said body 42 being connected by pins 43 to a control body 41.

The bottom side of the cam body 41 is provided with a nose 44 by means of which it extends in the groove opening of a groove field. The connection of the cam body 41 in the groove field is effected in customary manner by means of a groove block 46 arranged in the interior of the groove 45 (FIG. 16), which by means of a nose extends into a recess 47 of the nose 44 and is connected to the cam body 41 by means of a screw 48. When tightening the screw 48, the groove block is drawn against the bottom side of the groove flange while the cam body 41 is pressed against the bottom side of the groove flange. The bore in the cam body 41 or the passage of the screw 48 is in FIG. 9 designated with the reference numeral 59.

In conformity with the present invention, one or both sides of the cam body 41 are provided with a sequence of grooves 49 which may have, for instance, a depth of $t=0.25$ millimeter, a width of 1 millimeter and a spacing of 1 millimeter. These grooves 49 can be produced simultaneously with the forming of the cam body 41 so that the production of the fine scale does not require any additional working operation. Moreover, at the same time there will be assured that the fine scale 49 will with all cam bodies 41 produced in one and the same mold be located at precisely the same point and that no slight differences in the location of the fine scale with regard to the cam body 41 will be possible as it could occur otherwise if the fine scale were applied later.

Experience has shown that the grooves 49 can be produced with a proper sharp edge during the forming of the cam body 41.

The width of the grooves 49 and the spacing of the grooves from each other is advantageously so effected that they equal the spacing between two adjacent graduations of the desired fine scale, in the present instance as mentioned above, one millimeter.

For facilitating the setting of the program, the grooves 49 may be provided with marks, as for instance with roman numbers, or one of the grooves may be provided with a zero mark 50. The practical employment of the invention will be set forth further below in connection with FIGS. 16, 16a and 17.

FIGS. 11 to 15 illustrate a further embodiment of the control cam which is provided not only with a screw 48 with a groove block but also with a spring clamping device for connecting the control cam in the groove field 45. This embodiment differs from the above described embodiment primarily in that a body 52 of the spring clamping device is by means of screws 51 connected to the bottom side of the cam body 41. From FIGS. 12 and 15 it will be evident that the body 52 has a substantially I-shaped contour and in the central portion of its bottom side within a recess has a clamping body 53. This clamping body 53 will be pulled by a spring 55 toward the cam body 41. Inasmuch as the clamping body 53 is located in the groove 45 of the groove field 56, it firmly holds the control cam in the groove field.

In conformity with the invention, with this embodiment, the grooves 49 are pressed into the body 52 of suitable synthetic material on both sides of the upper flange. This is a preferable solution when, for instance, for structural reasons it is impossible to produce the grooves 49 directly in the cam body 41 while on the other hand the body 42 of the spring clamping device is formed of suitable material, as for instance acetone-resin FIGS. 16 and 17 show a special feature of the present invention. More specifically, the coarse scale 57 on the front side of the groove field 56 is provided with graduating lines the width of which equals half the width of the grooves 49. As a result thereof (FIG. 17), it will be assured that the cam body can be adjusted in the groove field with a precision which corresponds to half the width of groove 49. Thus, if the grooves 44 have a width of one millimeter, the graduating lines 57 will have a width of one half a millimeter, and an adjusting precision with the naked eye of one half a millimeter is obtaintable without difficulties. Beyond this precision, an estimate of intermediate values will be greatly facilitated.

The graduating lines 57 of the coarse scale are provided with corresponding markings 58.

When setting a program, the program setter first inserts the corresponding control cam into its groove 45 and moves the control cam in this groove up to the corresponding graduating line 57 of the coarse scale. It may be assumed that the zero mark 50 represents the precise control point of the control cam. If this control point is supposed to be located at the point "30 millimeters" of the groove field 56, the program setter sets the control cam in conformity with the illustration of FIG. 16a, which means he moves the groove edge of groove 49 located at the zero mark 50 so relative to the left-hand edge of the coarse scale graduation line 57 as to coincide therewith, said coarse scale graduation line 57 carrying the designation "30 millimeters."

If it is now desired to set the cam for instance with its control point to the graduation 31.5 of the coarse scale 56, the groove edge which follows the zero mark 50 is moved so that it coincides or registers with the right-hand edge of the coarse scale graduating line 30. All other intermediate values can be set and estimated quickly with the naked eye from the coarse scale graduation line 30 or 40.

In conformity with FIG. 18 of the drawings, the groove field 56a follows an arc and accordingly also the cam body 41a and the engaging body 42a will be correspondingly shaped. The connection in the grooves 45a is again effected by means of a groove block which is clamped fast to the cam body 41a by means of a screw 48a. It will be obvious that the grooves 49a of the fine scale in this instance form an angular graduation with, for instance, a 30′ groove width and distance, whereas the graduation lines 57a have an angular distance of, for instance, 5°.

It is, of course, to be understood that the present invention is, by no means, limited to the embodiments illustrated in the drawings but also comprises any modifications within the scope of the appended claims.

What is claimed is:

1. In combination with a member having elongated groove means therein and cam means shorter than the groove means on said member and each having a portion extending into the groove means for guiding the cam means along the groove means and for clamping the cam means to said member in adjusted positions along said groove means, and indicating means for indicating the precise position of the cam means along the groove means, said indicating means comprising; coarse graduations on said member extending at right angles to the length of said groove means, and fine graduations on said cam means on at least one side thereof extending to the edge of the cam means which is adjacent said member so that the graduations on the cam means will register with the graduations on said member as the cam means is adjusted along said groove means.

2. The combination according to claim 1 in which said coarse graduations are spaced apart a distance ten times as great as the distance between the said fine graduations.

3. The combination according to claim 1 in which said coarse graduations extend over the entire surface of said member on which the said cam means are mounted.

4. The combination according to claim 1 in which said fine graduations are on the side of the cam means which is visible from above.

5. The combination according to claim 4 in which said cam means includes recess means and a plate in the recess means on which said fine graduations are carried.

6. The combination according to claim 1 in which the fine graduations are located on said cam means in a position corresponding and complementary with regard to the direction of adjustment of the cam means in the groove means.

7. The combination according to claim 1 in which said member has a fine scale thereon on an uppermost portion thereof and which fine scale includes graduations which align with the said coarse graduations on the member.

8. The combination according to claim 1 in which said fine graduations comprise a series of spaced parallel grooves having sharp parallel edges, the width of said spaced grooves and the spacing therebetween being uniform and constant.

9. The combination according to claim 8 in which the spacing between said spaced grooves exactly equals the width of the respective grooves.

10. The combination according to claim 1 in which said groove means are curved and said cam means are correspondingly curved.

11. The combination according to claim 1 in which each cam means includes a first element in the respective groove means and a second element carried by the respective cam means outside the groove, spring means urging said elements toward each other to form a spring clamping device for the cam means, and said graduations being carried by said second element.

12. The combination according to claim 9 in which said coarse graduations also comprise spaced grooves with straight parallel sharp side edges with the said edges of each groove being spaced apart one-half the distance that the edges of each groove of the fine graduations are spaced apart.

13. The combination according to claim 12 in which the said spaced grooves and the regions between adjacent ones of said spaced grooves are of contrasting colors.

14. The combination according to claim 1 in which each cam means comprises a molded body and a hard wear resistant member carried by the body over the region thereof that is engaged by an element controlled by the respective cam means.

15. The combination according to claim 14 in which said fine graduations are molded directly into said body.

References Cited

UNITED STATES PATENTS

| | | |
|---|---|---|
| 2,469,761 | 5/1949 | Bodmer _____ 74—568 XR |
| 2,838,963 | 6/1958 | Good et al. |
| 2,861,471 | 11/1958 | Kronenberg _____ 74—573 |
| 2,996,935 | 8/1961 | Williams. |

FRED C. MATTERN, JR., Primary Examiner

F. D. SHOEMAKER, Assistant Examiner

U.S. Cl. X.R.

77—4